United States Patent [19]
Crane

[11] Patent Number: 5,281,859
[45] Date of Patent: Jan. 25, 1994

[54] AUTOMATICALLY SWITCHED POWER RECEPTACLE

[75] Inventor: Burke J. Crane, Lombard, Ill.

[73] Assignee: Molex Incorporated, Lisle, Ill.

[21] Appl. No.: 837,845

[22] Filed: Feb. 18, 1992

Related U.S. Application Data

[63] Continuation-in-part of Ser. No. 714,485, Jun. 13, 1991, abandoned.

[51] Int. Cl.$^5$ .............................................. H01H 33/54
[52] U.S. Cl. .................................... 307/139; 307/125; 307/38; 361/187; 361/186
[58] Field of Search ................... 307/139, 38, 64, 125, 307/19, 20, 23, 43–47, 67, 68, 84, 87; 361/187, 186

[56] References Cited
U.S. PATENT DOCUMENTS

| | | | |
|---|---|---|---|
| 4,915,639 | 4/1990 | Cohn et al. | 439/188 |
| 4,970,623 | 11/1990 | Pintar | 361/187 |
| 5,182,464 | 1/1993 | Woodworth et al. | 307/87 |

Primary Examiner—A. D. Pellinen
Assistant Examiner—Aditya Krishnan
Attorney, Agent, or Firm—Stephen A. Weiss

[57] ABSTRACT

A switched power circuit selectively connects an electrical load to any one of a plurality of branch power circuits. The switched power circuit includes a sensing circuit for sensing electrical loading on each of the branch circuits. A logic circuit is coupled to the sensing circuit for selecting one of the branch circuits to be connected to the load according to the sensed loading to provide balanced loading on each branch circuit.

17 Claims, 5 Drawing Sheets

AUTOMATICALLY SWITCHED POWER RECEPTACLE

CROSS REFERENCE

This application is a continuation-in-part of application no. 714,485, filed Jun. 13, 1991, abandoned.

FIELD OF THE INVENTION

This invention relates to electrical outlet receptacles and, more particularly, to an automatic electronic switching circuit for such a receptacle.

BACKGROUND OF THE INVENTION

Power distribution systems properly distribute and balance electrical power among plural loads. A typical distribution system often includes a single source of power providing power to plural electrical branch circuits. The branch circuits may provide power at equal levels, as required. For example, a typical power distribution system might include a polyphase power source in a wye configuration. The voltage across any pair of windings is 208 volts AC, while the voltage between any single terminal and a common or neutral point is 120 volts AC. The branch circuits may comprise any combination of the above.

In wiring a facility direct connections are often made between a load, such as an outlet receptacle, and one of the branch circuits. In such instances, the load demand or balance is, at best, estimated. It may turn out that load imbalances result owing to greater power requirements on some branch circuits than others.

The above problem is particularly acute in an office environment. With the advent of using modular furniture systems it is often desirable that lighting loads and outlet receptacles be provided as part of the modular furniture. However, such modular requirements often utilize modular wiring systems as part and parcel to the furniture components. Such systems are not conducive to hard wiring specific loads to specific branch circuits.

Co-pending application no. 714,487, assigned to the assignee hereof, discloses a power switching circuit for selectively connecting an electrical load to any one of a plurality of branch power circuits. This circuit uses a manually operated branch circuit selection switch.

The present invention is intended improve upon the power distribution systems discussed above, in a novel and simple manner.

SUMMARY OF THE INVENTION

In accordance with the invention, there is provided a power switching circuit for selectively, automatically connecting an electrical load to any one of a plurality of branch power circuits.

Broadly, there is disclosed herein a power switching circuit for selectively connecting an electrical load to any one of a plurality of branch power circuits. The power switching circuit includes sensing means for sensing electrical loading on each of the branch circuits. Logic means are coupled to the sensing means for selecting one of the branch circuits to be connected to the load according to the sensed loading to provide balanced loading on each branch circuit. Switch means are electrically connected to each branch circuit and to the load for selectively electrically connecting one of the branch circuits to the load. A control means is operated by the logic means for controlling the switch means to connect the selected branch circuit to the load.

It is a feature of the invention that the switch means comprises a plurality of triacs, one for each branch circuit.

It is a further feature of the invention that the control means comprises a plurality of optically driven SCR's, one for each triac.

It is still another feature of the invention that the switch means comprises a plurality of relays, one for each branch circuit.

In accordance with another aspect of the invention, a power switching circuit for an outlet receptacle comprises sensing means for sensing electrical loading on each of the branch circuits. Logic means are coupled to the sensing means for selecting one of the branch circuits to be connected to the receptacle according to the sensed loading to provide balanced loading on each branch circuit. A plurality of electrically controlled switches are each connected between a first conductor of one branch circuit and to a first input connection of the receptacle each for selectively electrically connecting or disconnecting the first conductor connected thereto to the first input connection. A plurality of electrically controlled switches are each connected between a second conductor of one branch circuit and to a second input connection of the receptacle, each for selectively electrically connecting or disconnecting the second conductor connected thereto to the second input connection. A control means is operated by the logic means for controlling the electrically controlled switches to connect the respective first and second conductors of the selected branch circuit to the receptacle first and second input connections.

In accordance with a further aspect of the invention there is disclosed an automatic controlled switching power receptacle circuit for selectively connecting each of a plurality of power receptacles to any one of a plurality of branch power circuits. The circuit comprises sensing means for sensing electrical loading on each of said branch circuits. Logic means are coupled to the sensing means for selecting a least loaded one of the branch circuits. A plurality of power receptacle control circuits each includes switch means electrically connected to each branch circuit and to one of the power receptacles for selectively electrically connecting one of the branch circuits to the one of the power receptacles and control means controlled by the logic means for controlling the switch means to connect the selected branch circuit to the one of the power receptacles.

Further features and advantages of the invention will readily be apparent from the specification and from the drawings.

DETAILED DESCRIPTION OF THE INVENTION

Figure 1:
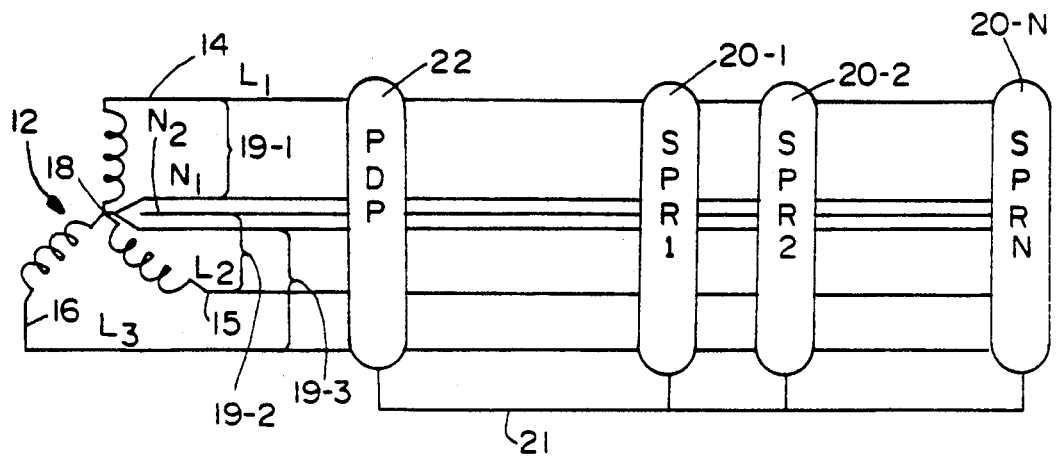
FIG. 1 is a schematic view illustrating an electrical power distribution system including automatically switched power receptacles according to the invention.

With reference to FIG. 1, a power distribution system 10 is illustrated. The power distribution system 10 includes a power source illustrated schematically in the form of a three phase wye connected winding 12. The winding 12 includes three phase terminals 14-16 and a common or neutral terminal 18. The first phase terminal 14 is connected to a conductor labelled L1. The second phase terminal 15 is connected to a conductor labelled L2. The third phase terminal 16 is connected to a conductor labelled L3. The neutral terminal 18 is connected to three conductors labelled N1-N3. With a typical power source, the voltage developed across any pair of phase terminals, i.e., terminals 14 and 15, is on the order of 208 volts AC, while the voltage between any phase terminal 14-16 and the neutral terminal 18 is 120 volts AC.

As illustrated, the power distribution system 10 includes three branch circuits 19-1 to 19-3. Each branch circuit, referred to generically as 19, includes a respective phase conductor L1-L3 and an associated respective neutral conductor N1-N3. The three branch circuits 19, each at 120 volts AC, power a plurality of N switched power receptacles (SPRs) 20-1, 20-2 through 20-N. Each of the switched power receptacles, referred to generally as numeral 20, operates to connect a load to one of the branch circuits 19 as selected by a power distribution panel (PDP) circuit 22, particularly, the PDP circuit 22 senses loading on the branch circuits 19 and transmits a signal on a line 21 to each SPR 20 identifying the selected branch circuit 19 to automatically provide load balancing.

Each branch circuit and other circuits associated specifically with that branch circuit are described herein using a suffix identifying the branch circuit number, i.e., 19-1. In fact each branch circuit and its associated circuits are usually identical. Therefore, when discussing any circuit generically the suffix is omitted herein, but is shown for each circuit in the drawing.

In accordance with the invention disclosed herein, the switched power receptacle 20 utilizes 120 volt AC power. Nevertheless, the teachings of the invention could be utilized in connection with a switched power receptacle operating off of 208 volts AC, or any other voltage, as necessary or desired.

Figure 2:
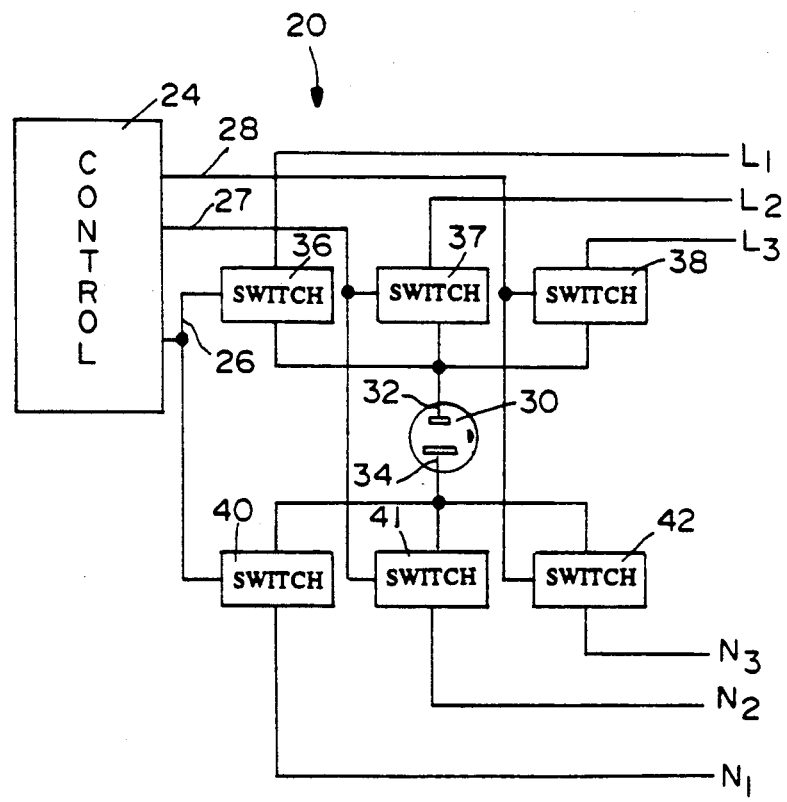
FIG. 2 is a partial schematic/block diagram illustrating the switched power receptacle of FIG. 1.

With reference to FIG. 2, the switched power receptacle 20 is illustrated. The switched power receptacle 20 includes a control circuit 24 connected to three control lines 26-28. In accordance with the invention, the control circuit 24 selects which branch circuit 19 is to be connected to a load, in the form of an outlet receptacle 30, as commanded by the PDP circuit 22, as discussed below. The outlet receptacle 30 has first and second input connections 32 and 34, respectively, The switched power receptacle 20 includes three hot electronic switch circuits 36, 37 and 38. Each electronic switch circuit 36-38 is connected between the "L" or hot conductor of one of the branch circuits 19 and the first input connection 32 of the outlet 30. For example, the first hot electronic switch circuit 36 is connected to the conductor L1 to selectively connect or disconnect the conductor L1 with the outlet first input connection 32. The switched power receptacle 20 also includes three neutral electronic switch circuits 40, 41 and 42. Each electronic switch circuit 40-42 is connected between the neutral or N conductor of one of the branch circuits 19 and the second input connection 34 of the outlet 30. For example, the first neutral electronic switch circuit 40 is connected to the conductor N1 to selectively connect or disconnect the conductor N1 with the outlet second input connection 34.

The first control line 26 is connected to the first electronic switch circuits 36 and 40 for controlling the same. Similarly, the second control line 27 is connected to the second electronic switch circuits 37 and 41, while the third control line 28 is connected to the remaining electronic switch circuits 38 and 42. Thus, control circuit 24 selects which of the hot electronic switch circuits 36-38 and corresponding neutral electronic switch circuits 40-42 are used to connect the selected branch circuit 19 to the outlet 30.

Figure 3:
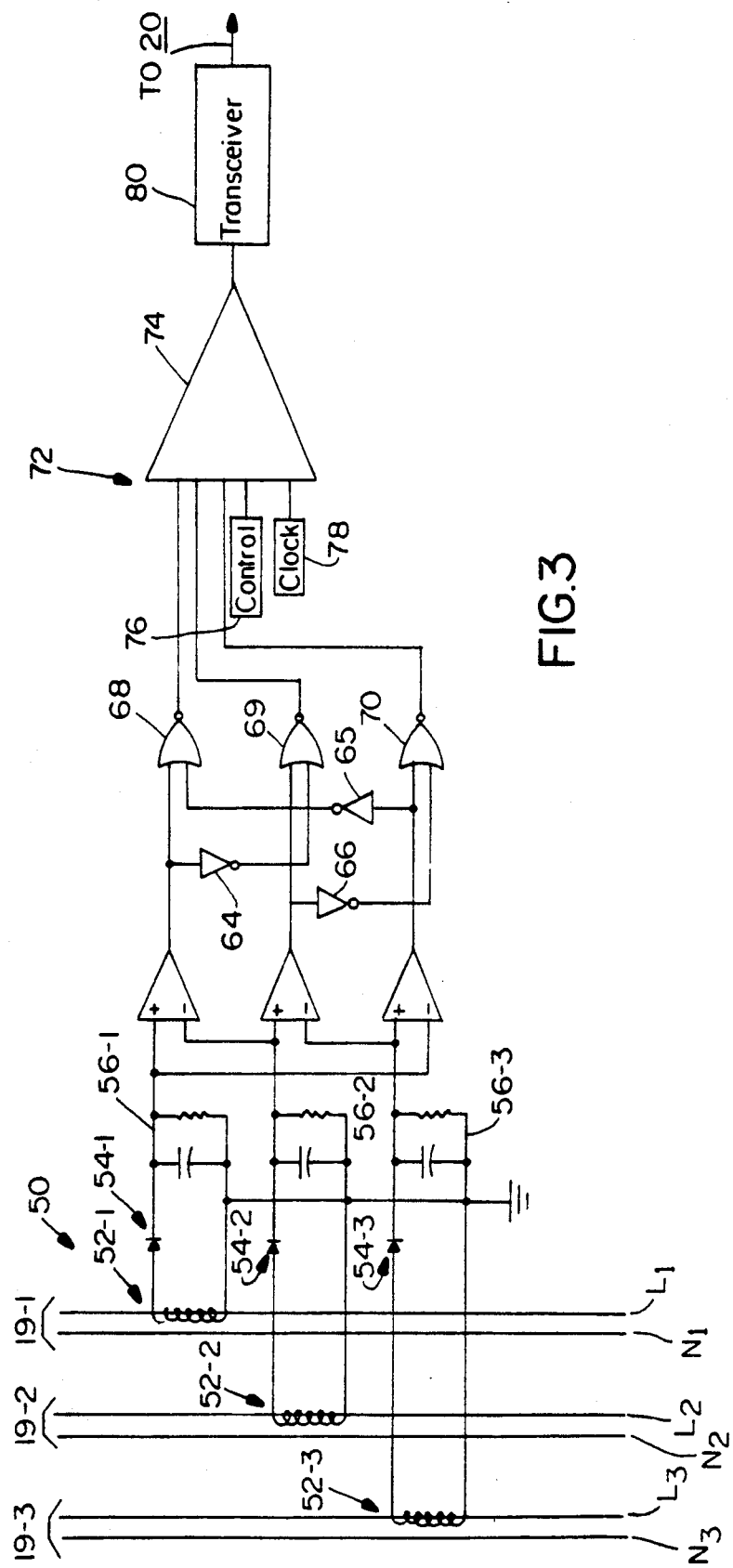
FIG. 3 is an electrical schematic diagram illustrating the switched power distribution panel circuit of FIG. 1.

With reference to FIG. 3, the power distribution panel circuit 22 is illustrated in greater detail. A current sense circuit 50 comprises three current transformers 52-1, 52-2 and 52-3. Alternatively, hall effect sensors could be used. The output from each current transformer 52-1, 52-2 and 52-3 is rectified by a respective diode 54-1, 54-2 and 54-3 and is filtered by a respective filter circuit 56-1, 56-2 and 56-3. The output of each filter circuit 56 is a DC voltage at a level representing branch circuit current.

A logic circuit 58 comprises three operational amplifiers (op amps) 58, 59 and 60 for comparing relative loading for the three branch circuits, as represented by the output of each filter circuit 56. Particularly, the first op amp 58 non-inverted input is connected to the first filter circuit 56-1 and the inverted input is connected to the second filter circuit 56-2 to compare the first and second branch circuits 19-1 and 19-2. The second op amp 59 non-inverted input is connected to the second filter circuit 56-2 and the inverted input is connected to the third filter circuit 56-3 to compare the. The third op amp 60 non-inverted input is connected to the third filter circuit 56-3 and the inverted input is connected to the first filter circuit 56-1 to compare the third and first branch circuits 19-3 and 19-1. For each op amp 58-60, if the voltage at the non-inverted input is greater than the voltage at the inverted input, then the output is a logic high. Conversely, if the voltage at the non-inverted input is less than the voltage at the inverted input, then the output is a logic low.

The outputs of the op amps 58-60 are connected to a logic select circuit 62 consist in three inverters 64, 65 and 66 and three NOR gates 68, 69 and 70. The three NOR gates 68-70 are associated with the three respective branch circuits 19. The select circuit 62 causes the NOR gate associated with the least loaded branch circuit to be in the logic high state. For example, if the first branch circuit 19-1 has the lowest current loading, then the output of the first NOR gate 68 is high and the outputs of the other NOR gates 69 and 70 are low.

The outputs of the NOR gates 68-70 are connected to a transmit circuit 72 for transmitting the selected branch circuit number to the SPRs 20. The transmit circuit 72 comprises a processor circuit 74 connected to a control circuit 76 and a clock 78. The processor circuit 74 may be, for example, a Neuron ® type 3210 integrated circuit manufactured by Echelon Systems including firmware programming for transmitting the selected branch number. The processor circuit 74 has I/O ports connected to the three NOR gates 68-70 and develops a serial output to a transceiver circuit 80 for transmitting the serial signal to the SPR's 20. Particularly, the processor circuit 74 serial output comprises a command representing the least loaded branch circuit 19. Because the SPR's 20 may be located some distance away, the transceiver circuit 80 is required for transmission. The transceiver circuit 80 may comprise any conventional transceiver circuit for transmitting and receiving a serial signal using Radio Frequency, or on a twisted pair wire, or over one of the branch circuit power conductors.

Figure 4:
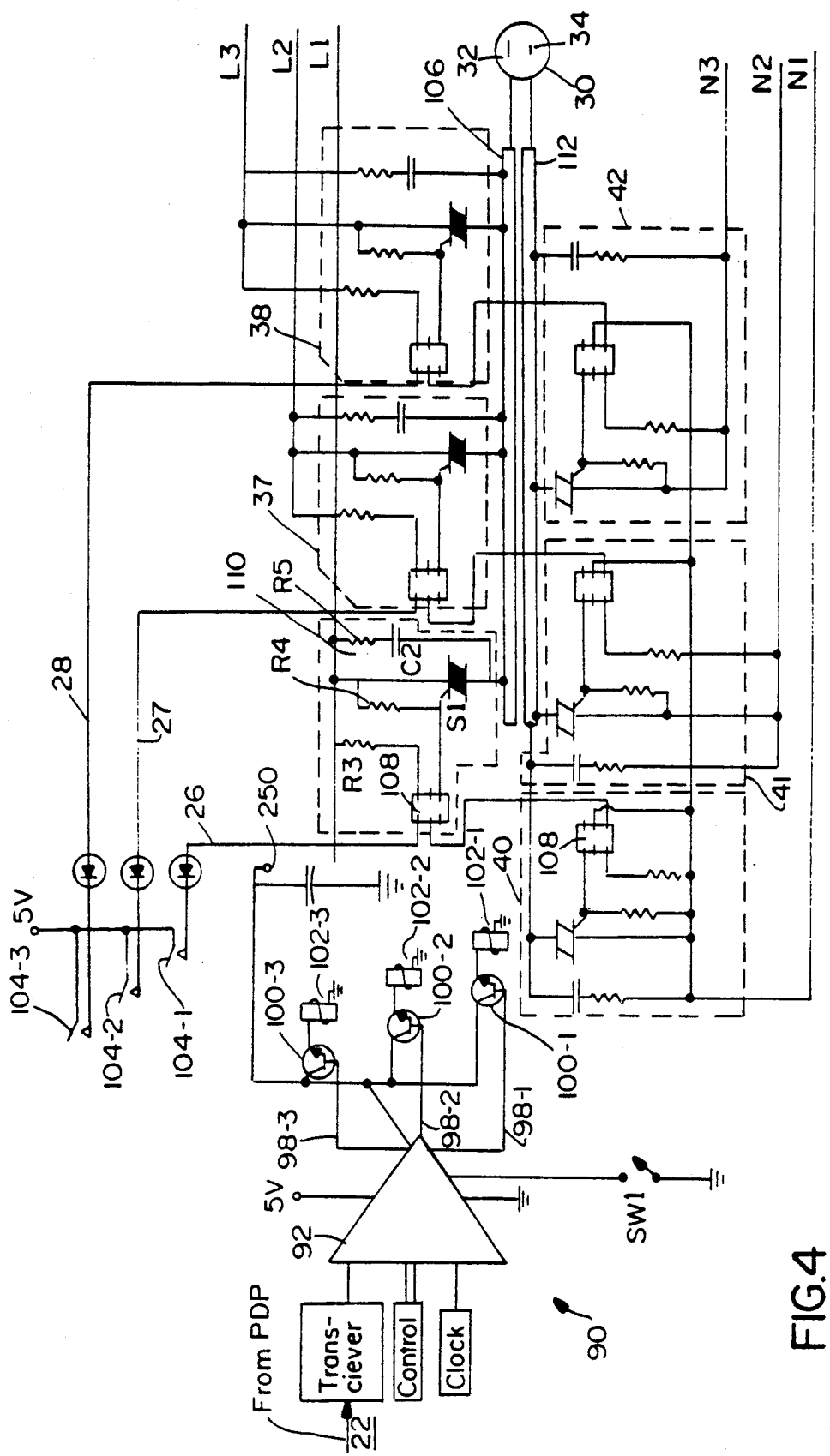
FIG. 4 is an electrical schematic diagram illustrating in greater detail the switched power receptacle of FIG. 2.

With reference to FIG. 4, the switched power receptacle 20 is illustrated in greater detail. A receive circuit 90 comprises a transceiver circuit 92 in communication with the power distribution panel transceiver circuit 80, see FIG. 3. The transceiver circuit 92 may also comprise any conventional transceiver for transmitting and receiving a serial signal using Radio Frequency, or on a twisted pair wire, or over one of the branch circuits. The serial signal from the transceiver circuit 90 is passed on to a processor circuit 92, similar to the circuit 74, see FIG. 3, also connected to a control circuit 94 and clock 96. The processor circuit 92 decodes the serial input signal for controlling I/0 ports connected to three lines 98-1, 98-2 and 98-3, one for each respective branch circuit 19-1 to 19-3.

The control circuit 24 shown in FIG. 2 comprises transistors 100-1, 100-2 and 100-3 driven by signals on the respective lines 98-1, 98-2 and 98-3, to in turn control respective relays 102-1, 102-2 and 102-3. Each relay 102-1, 102-2 and 102-3 includes an associated respective normally open contact 104-1, 104-2 and 104-3 for connecting low voltage power via respective LEDs L1, L2 and L3 to the lines 26, 27 and 28.

The switch SW-1 is actuated by the prong of a plug inserted in the outlet receptacle 30. Particularly, SW-1 connects a port on the processor circuit 92 to ground thereby signalling that a plug is inserted in the receptacle. For example, if the first branch circuit 19-1 is the least loaded when the switch SW-1 is closed, then the output on the line 98-1 is high, turning on the transistor 100-1 to actuate the relay 102-1. The switch SW-1 is also connected to the processor circuit 92 by way of firm ware to be used as a latch to prevent more than one relay 102 from being actuated once a plug is inserted in the outlet receptacle 30.

The first hot electronic switch circuit 36 includes a triac S1 having a gate G and terminals T1 and T2. The terminal T1 is connected to the first branch hot conductor L1. The terminal T2 is connected to a heat sink 106 for dissipating heat in the triac S1 and for providing electrical conduction to the outlet first input connection 32. The gate G is connected to a driver circuit 108. The driver circuit 108 comprises an optically driven SCR, such as a Motorola Type MOC3041 circuit. Particularly, the circuit 108 comprises a zero-crossing triac driver circuit triggered by a current through terminals 1 and 2 supplied from the first control line 26. The driver circuit 108 sends a current pulse to the triac S1 on each half cycle during triggering. This current pulse turns on the triac S1. The pulse is applied to the triac S1 near the zero voltage phase of the 120 volt AC wave reducing the generation of EMI.

A resistor R3 is connected between the branch conductor L1 and the driver circuit 108 to provide current limiting to prevent overdriving the LED L1. A resistor R4 is connected between the SCR gate G and terminal T1 to help turn off the SCR by eliminating a floating gate condition. A phase correction circuit 110 comprising a series resistor R5 and capacitor C2 is connected between the branch conductor L1 and the SCR terminal T2. The phase correction circuit 110 is necessary if there is switching from one branch circuit to another when a load is connected to the receptacle 30.

Each of the other hot electronic switch circuits 37 and 38 is identical to the circuit 36 and therefore is not discussed in detail. The only difference is that the respective circuits 37 and 38 are driven by the control lines 27 and 28, respectively, and are powered by the respective branch circuit conductors L2 and L3.

Similarly, the neutral electronic switch circuits 40-42 are virtually identical to the corresponding hot electronic switch circuits 36-38, respectively. One difference lies in that the driver circuit 108, see the circuit 40, has terminals 1 and 2 connected between terminal 2 of the driver circuit 108 of the electronic switch circuit 36 and the first branch circuit neutral conductor N1. Thus, the trigger circuit 108 of each first electronic switch circuit 36 and 40 for the first branch circuit are series connected to ensure that the associated triacs are turned on and off concurrently. Also, the terminal T2 of each triac S1 is connected to another heat sink 112 for dissipating heat in the triac S1 and for providing electrical conduction to the outlet second input connection 34.

Approximately 22-½ watts are dissipated by each active pair of triacs S1. The heat sink 106 is connected to all the hot line triacs of the circuits 36-38 while the heat sink 112 is connected to the triacs S1 of the neutral circuits 40-42 without requiring insulation between the heat sinks 106 and 112, and the triacs S1. The two heat sinks 106 and 112 act as conductors to the outlet receptacle 30 and require insulation therebetween and any other metal parts of the assembly.

Figure 5:
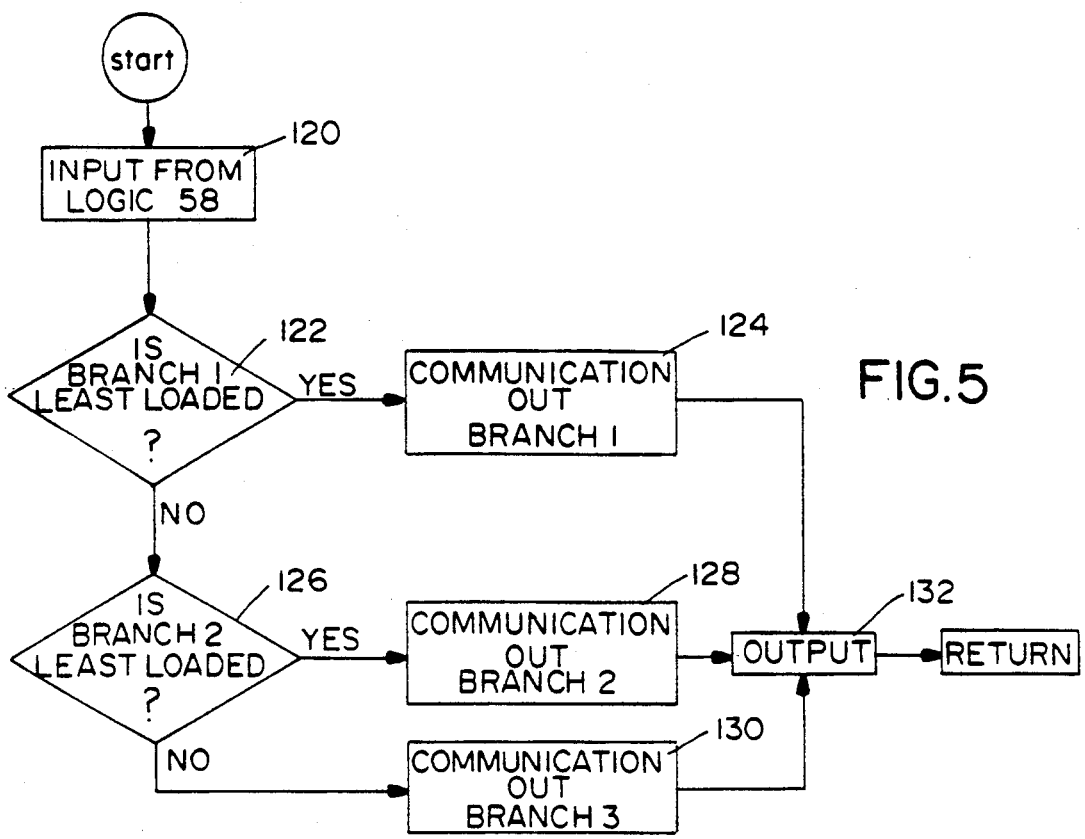
FIG. 5 is flow diagram illustrating a firmware program implemented in the processor of FIG. 3.

With reference to FIG. 5, a flow diagram illustrates operation of the firmware in the power distribution panel processor circuit 74 of FIG. 3. As discussed above, the processor circuit 74 includes plural discrete I/O ports and serial channel ports.

The routine begins at a block 120 which analyzes the I/O port inputs from the logic circuit 58. Particularly, the routine determines which NOR gate 68-70 has a high output, indicating the least loaded branch circuit. A decision block 122 determines if the first branch circuit 19-1 is the least loaded. If so, then a communication out register is set to branch 1 at a block 124. If not, then a decision block 126 determines if the second branch circuit 19-2 is the least loaded and. If so, then the communication out register is set to branch 2 at a block 128. If not, then in a block 130 the communication out register is set to branch three for the third branch circuit 19-3. From any of the blocks 124, 128 or 130, the branch number in the communication out register is output at a block 132 as by transmitting on a serial output channel a signal having the appropriate bit set to indicate the branch number. This signal is transmitted via the transceiver 80 to the switched power receptacles 20. The routine is then over and returns to start to be repeated.

Figure 6:
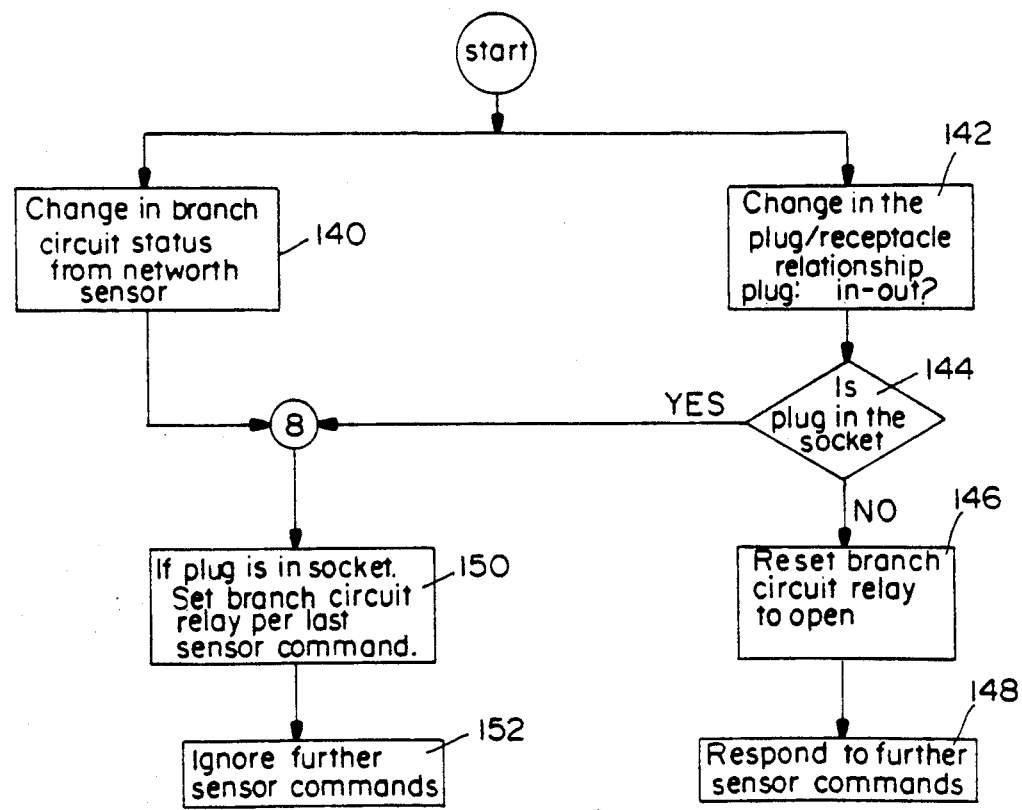
FIG. 6 is flow diagram illustrating a firmware program implemented in the processor of FIG. 4.

With reference to FIG. 6, a flow diagram illustrates operation of the firmware in the processor circuit 92 of each power receptacle 20. Each power receptacle 20 includes its own processor circuit 92 and is thus independently switched according to the status of the loading at the time a connection is made.

From a start node, the control can take one of two different paths. One includes a block 140 which determines if any change has been received on the serial channel from the power distribution panel 22. This would be a change in identification of the least loaded branch circuit 19. At a block 142 a determination is made if there is any change in the status of the plug switch SW-1, see FIG. 4. Particularly, the output ports for the processor circuit 92 remain off until a plug is inserted in the receptacle 30 and thereafter are latched until the plug is removed.

At a decision block 144 a determination is made if a plug is in the outlet receptacle 30. If not, then the output ports are turned off at a block 146 to de-energize all of the relays 102. At a block 148 the processor circuit 92 is then operable to respond to further commands from the power distribution panel 22 using the evaluation at the block 140. If there is a change in plug status as by a plug being inserted in the outlet receptacle 30, as determined at the decision block 144, and there is a change in branch circuit status from the block 140, then at a block 150 the line 98 for the selected branch circuit is set high to actuate the selected relay. For example, if the first branch circuit 19-1 is the least loaded, then the first control line 98-1 is set high to actuate the relay 102-1 to connect the receptacle 30 to the first branch circuit 19-1. Thereafter, further sensor Commands are ignored at a block 152 until a change in the plug status is sensed.

With the above-described structure, each SPR 20 operates independently to provide load balancing. Normally, a plug would not be inserted in the receptacle 30 of each SPR 20 simultaneously. Assuming this to be true, then each individual SPR 20 would have its receptacle 30 connected to the least loaded branch circuit at the time that the plug is inserted.

Figure 7:
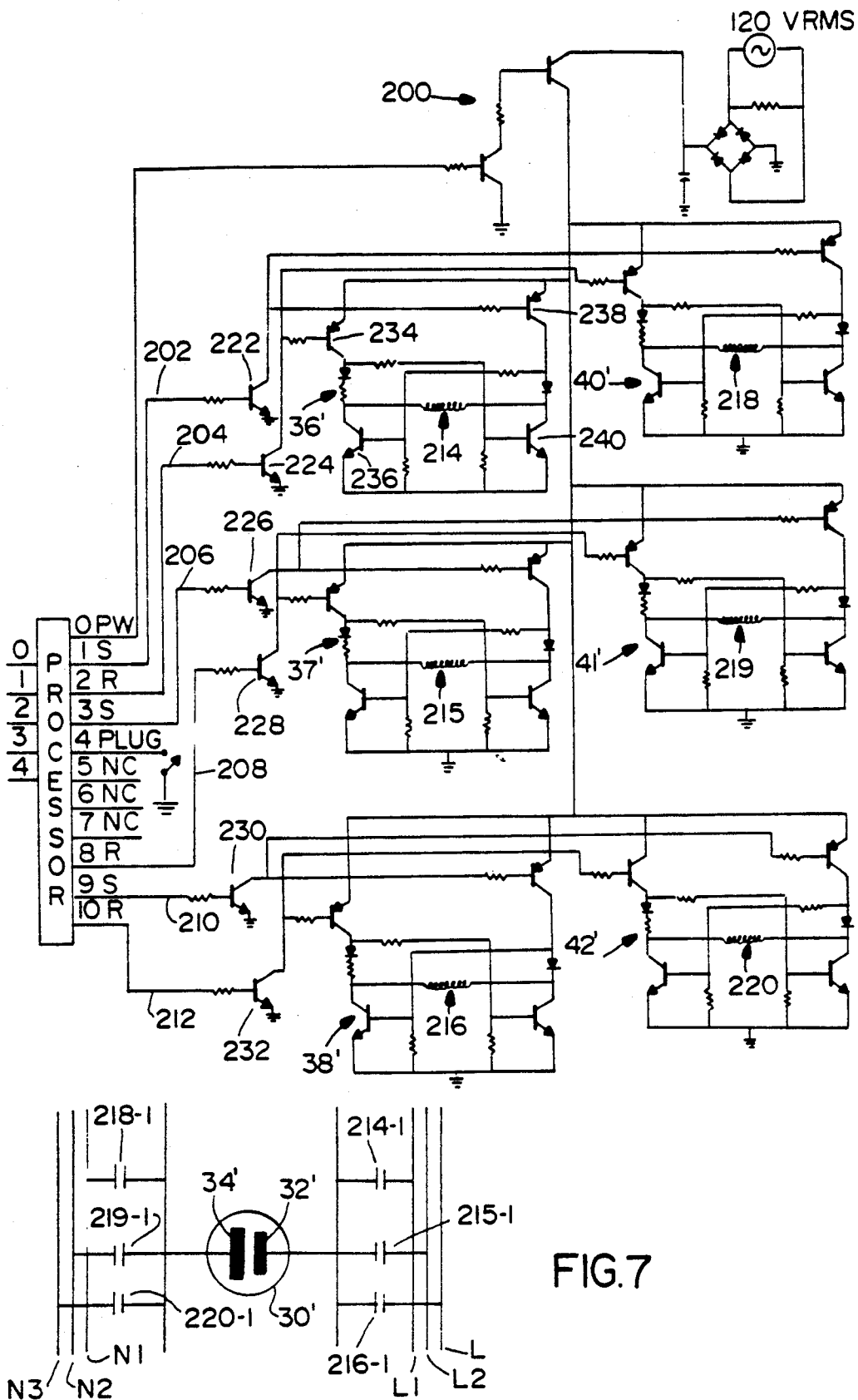
FIG. 7 is an electrical schematic diagram illustrating in greater detail the switched power receptacle of FIG. 2 according to an alternative embodiment of the invention.

With reference to FIG. 7, an electrical schematic for a switch power receptacle 20' according to an alternative embodiment of the invention is illustrated. For purposes of simplicity, elements in the circuit of FIG. 7 corresponding to elements of the circuit of FIG. 5 are referenced with like, primed reference numerals.

The SPR 20' includes a power circuit 200 for converting 120 volt AC power from one of the branch circuits to DC power for powering DC circuitry. This power is also applied to a processor circuit 92' which is programmed generally similar to the processor circuit 92 of FIG. 4. The principal difference lies in the use of two output ports for each branch circuit. One port is used as a set function, and the other port is used as a reset function. Set and reset lines 202 and 204 for the first branch circuit are connected to terminals 1 and 2 of the processor circuit 92'. Set and reset lines 206 and 208 are connected to terminals 3 and 8 of the processor circuit 92', respectively. Set and reset lines 210 and 212 for the third branch circuit are connected to terminals 9 and 10 of the processor circuit 92'. The prong switch SW-1, for sensing a prong in the receptacle 30', is connected between ground and terminal 4 of the processor circuit 92'.

The switched power receptacle 20' includes three hot electronic switch circuits 36', 37' and 38'. The three hot electronic switch circuits 36', 37' and 38' include respective relay coils 214, 215 and 216. Associated with each relay coil 214, 215 and 216 is a normally open relay contact, 214-1, 215-1 and 216-1. Each relay contact, 214-1, 215-1 and 216-1 is connected between the L1, L2 and L3 conductors, respectively, of the branch circuits and the first input connection 32' of the outlet receptacle 30'. For example, the first hot electronic switch circuit relay contact 214-1 is connected to the conductor L1 to selectively connect the conductor L1 to the outlet first input connection 32'.

The switched power receptacle 20' also includes three neutral electronic circuits 40', 41' and 42'. Each neutral electronic switch circuit 40', 41' and 42' includes an associated relay coil 218, 219 and 220. Each relay coil 218, 219 and 220 includes a respective associated normally open contact 218-1, 219-1 and 220-1. Each relay contact 218-1, 219-1 and 220-1 is connected between the respective neutral conductor N1, N2 and N3 of the branch circuits 19 and the second input connection 34' of the outlet receptacle 30'. For example, the first neutral electronic switch circuit relay contact 218-1 is connected to the conductor N1 to selectively connect the conductor N1 to the outlet second input connection 34'.

Each of the control lines 202, 204, 206, 208, 210 and 212 from the processor circuit 92' drives an associated respective transistor 222, 224, 226, 228, 230 and 232. These transistors are used for converting from the low voltage level used by the processor circuit 92' and the higher voltage level required for the relay coils 214-216 and 218-220.

The first hot electronic switch circuit 36' includes four transistors 234, 236, 238 and 240 in a "totem pole" configuration for driving the relay coil 214. When the associated set control line 202 drives the transistor 222, then the second and third transistors 238 and 236 are energized to provide power to the relay coil 214 in one direction. This closes the associated contact 214-1. To turn off the relay coil, it is necessary to deactivate the set line 202 and activate the reset line 204 to drive the transistor 224. This causes the opposite legs of the circuit to turn on as by driving the transistors 234 and 240 to reverse the current flow through the relay coil 214. However, the current is of a reduced magnitude owing to the 420 ohm resistor R1. Particularly, reversing current flow reduces magnetic flux and the resistor R1 assures zero flux in the relay core to allow armature release to open the associated contact 214-1.

Each of the other hot electronic switch circuits 37' and 38' is identical to the circuit 36' and therefore is not discussed in detail. The only difference is that the respective circuits 37' and 38' are driven by the different control lines from the processor circuit 92'.

Similarly, the neutral electronic switch circuits 40'-42' are virtually identical to the corresponding hot electronic switch circuits 36'-38', respectively. As a result, when any one of the hot electronic switch circuits 36'-38' is turned on or off, the associated corresponding neutral electronic switch circuits 40'-42' is also turned on or off so that both the first and second input connections 32' and 34' of the outlet receptacle 30' are connected to the same branch circuit, or no branch circuit, at any given time.

With the embodiment of FIG. 7, the control program implemented in the processor 92' is virtually identical. The one difference being that instead of turning all output ports off when the plug is removed, the reset line for the selected branch is turned on to disconnect the receptacle 30' from the selected branch circuit. This action was not necessary with the embodiment of FIG. 4 in which the relay was de-energized simply by removing the high signal from the control line.

Thus, in accordance with the invention there is disclosed a switched power receptacle which automatically switches an outlet receptacle to both the hot and neutral sides of any one of a plurality of branch circuits to provide load balancing.

I claim:

1. An automatic switched power circuit for selectively connecting an electrical load to any one of a plurality of branch power circuits, comprising:

sensing means for sensing electrical loading on each of said branch circuits;

logic means coupled to said sensing means for selecting one of said branch circuits to be connected to said load according to the second loading to divide the loading substantially equally among the branch circuits to provide balanced loading on each said branch circuit;

switch means electrically connected to each branch circuit and to said load for selectively electrically connecting one of said branch circuits to said load; and control means controlled by said logic means for controlling said switch means to connect the selected branch circuit to said load.

2. The automatic switched power circuit of claim 1 wherein said switch means comprises a plurality of triacs, one for each branch circuit.

3. The automatic switched power circuit of claim 2 wherein said control means comprises a plurality of optically driven SCR's, one for each said triac.

4. The automatic switched power circuit of claim 1 wherein said switch means comprises a plurality of relays, one for each branch circuit.

5. The automatic switched power circuit of claim 1 wherein said logic means selects the least loaded branch circuit.

6. The automatic switched power circuit of claim 1 wherein said sensing means senses current in each branch circuit.

7. A switched power circuit for selectively connecting an electrical load having first and second input connections to any one of a plurality of branch power circuits, each branch circuit including a first and a second conductor defining a relative voltage therebetween, comprising:

sensing means for sensing electrical loading on each of said branch circuits;

logic means coupled to said sensing means for selecting one of said branch circuits to be connected to said load according to the sensed loading to divide the loading substantially equally among the branch circuits to provide balanced loading on each said branch circuit;

a plurality of electrically controlled switches each connected between the first conductor of one said branch circuit and to said first input connection of said load each for selectively electrically connecting or disconnecting the first conductor connected thereto to said first input connection;

a plurality of electrically controlled switches each connected between the second conductor of one said branch circuit and to said second input connection of said load each for selectively electrically connecting or disconnecting the second conductor connected thereto to said second input connection; and control means operated by said logic means for controlling said electrically controlled switches to connect the respective first and second conductor of the selected branch circuit to said load first and second input connections.

8. The switched power circuit of claim 7 wherein each said first and said second electrically controlled switches comprise a triac.

9. The switched power circuit of claim 8 wherein said control means comprises a plurality of optically driven SCR's, one for each said triac.

10. The switched power circuit of claim 6 wherein each said first and said second electrically controlled switches comprise a relay.

11. A switched power receptacle for selectively connecting an electrical outlet receptacle having first and second input connections to any one of a plurality of branch power circuits, each branch circuit including a first and a second conductor defining a relative voltage therebetween, comprising:

sensing means for sensing electrical loading on each of said branch circuits;

logic means coupled to said sensing means for selecting one of said branch circuits to be connected to said load according to the second loading to divide the loading substantially equally among the branch circuits to provide balanced loading on each said branch circuit;

a plurality of electrically controlled switches each connected between the first conductor of one said branch circuit and to said first input connection of said receptacle each for selectively electrically connecting or disconnecting the first conductor connected thereto to said first input connection;

a plurality of electrically controlled switches each connected between the second conductor of one said branch circuit and to said second input connection of said receptacle each for selectively electrically connecting or disconnecting the second conductor connected thereto to said second input connection; and control means operated by said logic means for controlling said electrically controlled switches to connect the respective first and second conductor of the selected branch circuit to said receptacle first and second input connections.

12. The switched power receptacle of claim 11 wherein each said first and said second electrically controlled switches comprise a triac.

13. The switched power receptacle of claim 12 wherein said control means comprises a plurality of optically driven SCR's, one for each said triac.

14. The switched power receptacle of claim 11 wherein each said first and said second electrically controlled switches comprise a relay.

15. An automatic controlled switching power receptacle circuit for selectively connecting each of a branch power circuits, comprising:

sensing means for sensing electrical loading on each of said branch circuits;

logic means coupled to said sensing means for selecting a least loaded one of said branch circuits;

a plurality of power receptacle control circuits each including switch means electrically connected to each branch circuit and to one of said power receptacles for selectively electrically connecting one of said branch circuits to said one of said power receptacles and control means controlled by said logic means for controlling said switch means to connect the selected branch circuit to said one of said power receptacles.

16. The automatic controlled switching power receptacle circuit of claim 15 wherein each said power receptacle control circuits includes means for sensing if a plug is inserted in said receptacle and said control means operates said switch means only after a plug is sensed to connect the power receptacle to the branch circuit selected at the time the plug is inserted.

17. A switched power circuit for selectively connecting a single phase electrical load having first and second input connections to any one of a plurality of single phase branch power circuits, each branch circuit including a first and a second conductor defining a relative voltage therebetween, comprising:

loading sensing means for selecting which of said branch circuits is to be connected to said load;

first switch means electrically connected to the first conductor of each branch circuit and to said first input connection of said load for selectively electrically connecting one of said first conductors to said first input connection;

second switch means electrically connected to the second conductor of each branch circuit and to said second input connection of said load for selectively electrically connecting one of said second conductors to said second input connection; and control means operated by said load sensing means for controlling said first switch means and said second switch means to connect the respective first and second conductor of the selected branch circuit to said load first and second input connections.

* * * * *

UNITED STATES PATENT AND TRADEMARK OFFICE
CERTIFICATE OF CORRECTION

PATENT NO. : 5,281,859
DATED : January 25, 1994
INVENTOR(S) : Burke J. Crane

It is certified that error appears in the above-indentified patent and that said Letters Patent is hereby corrected as shown below:

In item: 63, line 2 of the cover page, delete "abandoned", and in column 1, line 8, delete "abandoned".

Signed and Sealed this

Thirteenth Day of December, 1994

Attest:

BRUCE LEHMAN

*Attesting Officer*     *Commissioner of Patents and Trademarks*